July 11, 1961

C. W. HILL 2,992,320

GAS SHIELDED ARC WELDING TORCH NOZZLE

Filed March 24, 1959

INVENTOR
CLIFFORD W. HILL

BY

Richard S. Shreve
ATTORNEY

United States Patent Office 2,992,320
Patented July 11, 1961

2,992,320
GAS SHIELDED ARC WELDING TORCH NOZZLE
Clifford W. Hill, Mountainside, N.J., assignor to Union Carbide Corporation, a corporation of New York
Filed Mar. 24, 1959, Ser. No. 801,599
5 Claims. (Cl. 219—75)

This invention relates to gas shielded arc welding torch nozzles for torches of the type shown in Meredith Patent No. 2,376,265 and Herbst Patent No. 2,468,805.

Up until recent years, the majority of the shielding gas cups or nozzles used with electric welding torches were made of high heat conductivity copper. This material was used since it was not susceptible to mechanical breakage and would withstand high temperatures at the current capacities required for varied welding operations. However, the use of an electrically conductive material for cups had certain disadvantages. The cups had to be insulated from the current-carrying elements in the torch. Especially when using ACHF, the insulation and/or space gap had to be sufficient between the current-carrying collet body and cup to prevent high-frequency discharge to these parts resulting in the welding current following this path and damaging the equipment. This necessarily added undesirably to the bulk and size of the torch as well as complicating torch design. Also, in order to prevent melting of the cup material and insure an acceptable useful cup-life span, the mass of copper in the cups had to be great enough to dissipate a considerable amount of heat. This necessarily added still more to the weight of the torch.

In order to eliminate the arcing and manifold design problems, as well as make it possible to produce a torch small enough in size and light enough in weight to satisfy the demands of the operators, cups made of ceramic materials were adopted. Being electrically non-conductive, it was no longer necessary to insulate the ceramic cups from the current-carrying torch elements. This eliminated the water leakage problems by permitting the use of a closed metallic water chamber, with silver soldered joints, in the head of the torch. The combined result was a significant reduction in the torch head size and, thus, the weight and bulk of the torch.

However, the ceramic cups presented new problems of their own. They were susceptible to mechanical breakage. Also, the ceramic material, an aluminum silicate, could only be operated at currents below about 225 amps. due to the limited heat resistance and very low thermal conductivity of the material. For the great majority of welding applications, the current rating for the torch should be at least 300 amps.

It is, therefore, the main object of the present invention to provide an electrically non-conductive gas-directing cup or nozzle which meets this 300 amp. current rating requirement and also is sufficiently resistant to mechanical breakage.

According to the present invention, the gas-directing nozzle comprises an insert of ceramic material having a top facing the torch barrel and a bore receiving the electrode holder in the upper portion thereof with the electrode depending therefrom in centered relation and a lower portion surrounding the electrode and forming the shielding gas chamber, and a press-fitted steel jacket covering the outer surface of said ceramic insert and extending from below said top down outside of said shielding gas chamber. Preferably the ceramic insert is constructed of high alumina of the order of 94.7%. The bore of the insert may have an intermediate threaded portion to be screwed onto the electrode holder.

Figure 1:
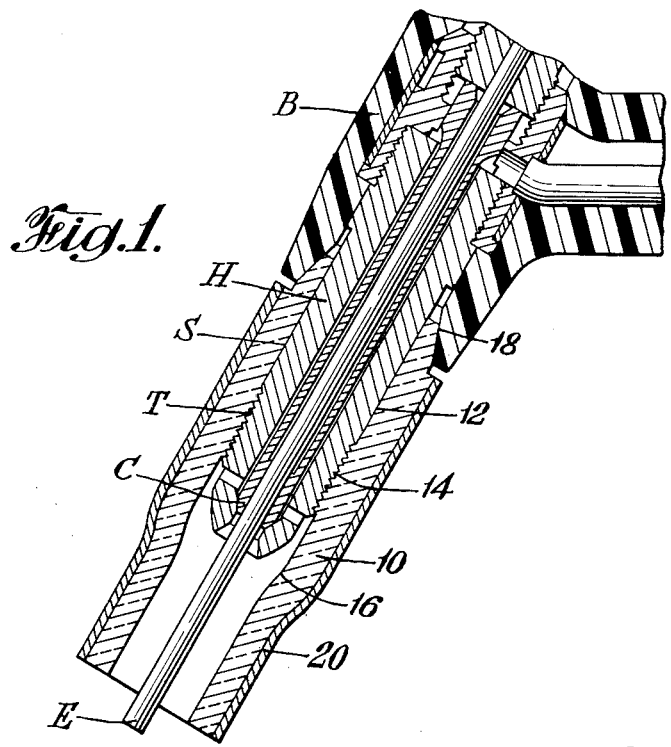
FIG. 1 is a section through a torch provided with a gas-directing nozzle according to the preferred embodiment of the present invention.

The use of a relatively new ceramic material, which is roughly 94.7% alumina, is a partial solution to the problem. These high alumina cups have about seven times greater thermal conductivity than the aluminum silicate cups and somewhat greater heat resistance. Also, the high alumina cups are much stronger, having an impact strength approximately four times that of the aluminum silicate cups. Thus, they have a much greater resistance to mechanical breakage.

The high alumina cups can be operated at 300 amps. for some applications. However, for other applications, such as when DC–SP is used with a heavy duty cycle, the alumina cups can only be operated at 250 to 275 amps.

In order to increase the current capacity of these cups and further improve their resistance to mechanical breakage, a steel sleeve is press-fitted over the O.D. of the high alumina cups. The result is a torch cup that is highly resistant to mechanical breakage and which permits operation at from 25 to 35 amps. higher current, depending upon the application, due to the greater heat transfer from the hot end of the cup to the water-cooled torch body.

The torch shown in FIG. 1 comprises a torch body B with an electrode holder H therein having a cylindrical upper surface S with external threads T therebelow and electrode contacting means C engaging an electrode E below the threads T.

The gas-directing nozzle comprises an insert 10 of ceramic material having a bore provided with an upper cylindrical portion 12 to receive the surface S of the holder. The bore is also provided with an internally threaded intermediate portion 14 to receive the holder threads T, and a lower portion 16 surrounding the electrode contacting means C and forming the shielding gas chamber.

The outer surface of the insert 10 has a top 18 facing the torch body B, and a pressed-steel jacket 20 covering said outside surface below said top and extending down outside of the surface S, the threads 14 and on down outside said shielding gas chamber formed by the lower portion 16 surrounding the contacting means C.

Steel sleeve 20 is pressed over the high alumina cup 10, such as to insure intimate contact between the steel and the alumina. This intimate contact aids in transferring the heat from the hot end of the cup to the upper cooler end.

The failure of the high alumina cups without sleeves at 300 amps. was rarely due to melting, but rather to thermal shock due to thermal gradients which created stresses in excess of the strength of the material. Apparently, the added heat path created by the steel sleeve sufficiently reduces these thermal gradients as to prevent failure due to thermal shock. Also, there is the possibility that the sleeve, which is forced over the alumina cup, exerts a compressive force on the alumina which reduces the maximum stresses due to the thermal gradients.

Copper sleeves were also tried for this purpose since copper is a better heat conductor than steel. However, the too great coefficient of thermal expansion of the copper caused the copper sleeve to drop away from the alumina cup when welding at high currents.

Figure 2:
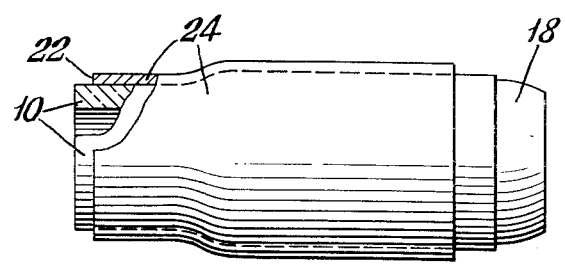
FIG. 2 is an elevation in partial section of a modification of the nozzle.

One modification of the sleeved cup assembly is shown in FIG. 2, the front end 22 of sleeve 24 is located about ⅛" back from the front end of the ceramic cup 10. This modification, though more susceptible to failure due to thermal shock than the preferred embodiment, has the advantage of preventing arcing should the torch operator accidentally touch the end of the cup to the workpiece. With the steel sleeve flush with the end of the cup, as in the preferred embodiment, there is the possibility of accidental contact between the metal sleeve and the workpiece resulting in arcing of the welding current from the end of the electrode to the grounded cup when high frequency is used. This may result in a portion of the thin walled steel sleeve being melted off.

Figure 3:
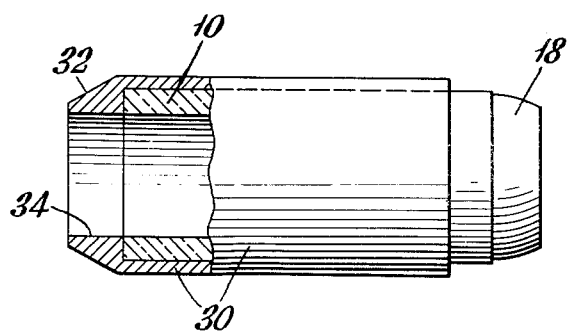
FIG. 3 is a similar view of a further modification.

A second modification is shown in FIG. 3. The steel sleeve 30 has an overhanging front end section 32 having an inside diameter at 34 the same as that of the alumina cup 10. Besides removing the alumina cup further back from the arc, this places an additional mass of material at the hot end of the sleeve that shields the front end of the alumina cup and, therefore, further decreases the susceptibility of the alumina cup to failure due to thermal shock. Also, this considerable increase in the mass of steel at the hot end of the cup assembly is not as susceptible to damage as the thin walled sleeve, should the operator accidentally ground the cup against the workpiece and so cause arcing between the electrode and the front end of the sleeve. The higher cost of this modification, due to the increased material and machining required, however, off-sets to a large extent the above advantages.

Steel sleeves, similar to the preferred embodiment shown in FIG. 1 except that the cylindrical sleeve is split for its full length down one side, have been tried also and found to function satisfactorily.

What is claimed is:

1. In a gas shielded arc welding torch having a body with an electrode holder therein, an air cooled gas-directing nozzle comprising an annular thick-walled insert of ceramic material having a top facing said body and a bore receiving said holder in the upper portion thereof with the electrode depending therefrom in centered relation and a lower portion surrounding the electrode and forming the shielding gas chamber, and a press-fitted single thickness thin-walled steel jacket covering the outer surface of said ceramic insert and having a bare steel outer surface completely exposed to the ambient atmosphere and extending from below said top down outside of said shielding gas chamber.

2. In a gas shielded arc welding torch having a body with an electrode holder therein having a cylindrical upper surface with external threads therebelow and electrode contacting means below said threads, an air-cooled gas directing nozzle comprising an annular thick-walled insert of ceramic material having a larger bore provided with an upper cylindrical portion to receive the corresponding surface of said holder, an intermediate internally threaded portion to receive the holder threads, and a lower coaxial smaller cylindrical bore surrounding the electrode below said contacting means and forming the shielding gas chamber, the outer surface of said ceramic insert having a top facing said torch body, and a press-fitted thin-walled single thickness steel jacket covering said outside surface below said top and having a bare steel outer surface completely exposed to the ambient atmosphere and extending down outside of said internally threaded portion and on down outside of said shielding gas chamber.

3. In a gas shielded arc welding torch having a body with an electrode holder therein, an air-cooled gas-directing nozzle comprising an annular thick-walled insert of ceramic material constructed of alumina of the order of 94.7% having an annular rounded top received inside said body and above the bottom thereof, a bore receiving said holder in the upper portion thereof with the electrode depending therefrom in centered relation and a lower reduced portion surrounding the electrode and forming the shielding gas chamber, and a single thickness thin-walled press fitted steel jacket covering the outer surface of said ceramic insert and having a bare steel outer surface completely exposed to the ambient atmosphere and extending from below said top down outside said shielding gas chamber.

4. In a gas shielded arc welding torch having a body with an electrode holder therein, an air cooled gas directing nozzle comprising an annular thick-walled insert of alumina having a top facing said barrel and a bore having an enlarged upper portion receiving said holder with the electrode depending therefrom in centered relation with a reduced cylindrical portion of said bore surrounding the lower portion of the electrode, and a single thickness thin-walled press fitted steel jacket having a cylindrical portion covering said ceramic insert outside of said enlarged portion of the bore and a smaller cylindrical surface outside of the reduced cylindrical portion of said bore, said jacket having a bare steel outer surface completely exposed to the ambient atmosphere and extending from below said top down outside of said alumina insert but terminating short of the bottom thereof.

5. In a gas shielded arc welding torch having a body with an electrode holder therein, an air cooled gas directing nozzle comprising an insert of ceramic material having a top facing said body and a bore receiving said holder in the upper portion thereof with the electrode depending therefrom in centered relation and a lower portion surrounding the electrode and forming the shielding gas chamber, and a single thickness press fitted steel jacket covering the outer surface of said ceramic insert and having a bare steel outer surface completely exposed to the ambient atmosphere and extending from below said top down outside of said shielding gas chamber and inward forming a rim under the bottom of said insert to align with the bottom of the insert bore.

References Cited in the file of this patent
UNITED STATES PATENTS

| | | |
|---|---|---|
| 1,911,033 | Nagashev | May 23, 1933 |
| 2,468,805 | Herbst | May 3, 1949 |
| 2,550,495 | Pilia | Apr. 24, 1951 |
| 2,612,584 | Morrissey | Sept. 30, 1952 |
| 2,616,017 | Anderson | Oct. 28, 1952 |